Patented Oct. 3, 1944

2,359,459

UNITED STATES PATENT OFFICE 2,359,459

TREATMENT OF VINYL TYPE HALIDES

John Anderson, Berkeley, Raymond M. Stager, Jr., Albany, and Sumner H. McAllister, Lafayette, Calif., assignors to Shell Development Company, San Francisco, Calif., a corporation of Delaware No Drawing. Application July 3, 1942, Serial No. 449,664

8 Claims. (Cl. 260—593)

This invention relates to the treatment of halogen-containing unsaturated organic compounds and it more particularly pertains to the hydration of halogen-containing unsaturated organic compounds. The invention provides a practical and economical method for preparing carbonylic compounds, i. e. compounds comprising an aldehyde and/or a ketone group, from vinyl-type halides.

The process of the invention is executed by reacting a vinyl-type halide and water in the vapor state in the presence of an acidic hydration agent or catalyst deposited on a solid material, preferably of an absorbent character, and recovering the product from the reacted mixture produced, the nature of the product being dependent upon the structure of the particular vinyl-type halide subjected to treatment.

Vinyl-type halides are distinguished from non-vinyl-type unsaturated halides in that they contain at least one halogen atom which is attached to an unsaturated carbon atom. Thus, any organic compound embracing any one or more of the structures or groupings, (I)
$$\begin{array}{cc} H & Hal \\ -C\!=\!C- \end{array}$$

(II)
$$\begin{array}{cc} H & Hal \\ C\!=\!C\!-\!Hal \end{array}$$

(III)
$$\begin{array}{cc} Hal & Hal \\ -C\!=\!C- \end{array}$$

(IV)
$$\begin{array}{cc} Hal & Hal \\ -C\!-\!-C\!-\!Hal \end{array}$$

(V)
$$\begin{array}{cc} C & Hal \\ C\!-\!C\!=\!C- \end{array}$$

(VI)
$$\begin{array}{cc} C & Hal \\ C\!-\!C\!=\!C\!-\!Hal \end{array}$$

may be properly designated a vinyl-type halide, while the term "vinylic carbon atom" may be applied to either of the unsaturated carbon atoms in each grouping. The grouping may comprise part of an iso or normal alkyl chain which may or may not be attached to a cyclic radical as of the aromatic, alicyclic, and heterocyclic series or may comprise part of an alicyclic structure. The organic compound may or may not contain one or more halogen atoms in addition to the halogen atom or atoms contained in one or more of the above groupings comprised therein.

The present process is applicable to the treatment of any vinyl-type halide. The treated compound may contain one or a plurality of double bonds but it is preferred to execute the process with compounds devoid of conjugated double bonds because of the tendency of such compounds to polymerize under the operating conditions. If the treated compound contains more than one double bond, one or a plurality of the double bonds may link vinylic carbon atoms. The carbon atoms of the one or more vinylic groupings in the compound treated may be either primary, secondary, or tertiary, i. e. linked to either one, two or three other carbon atoms. A suitable group of unsaturated halides to which the process is applicable includes among others compounds such as the following, together with their homologues, analogues and suitable substitution products.

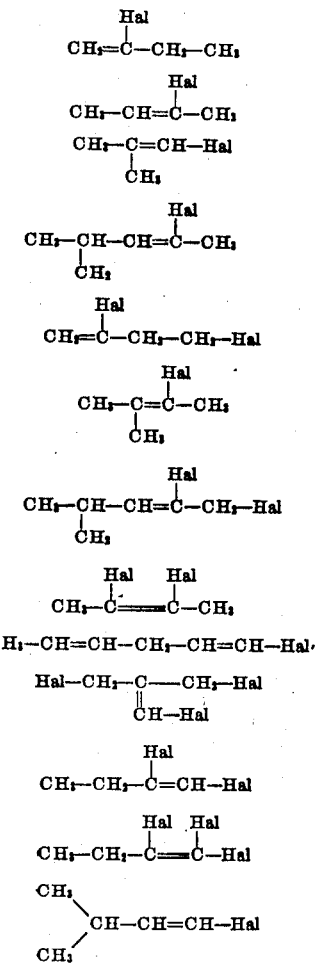

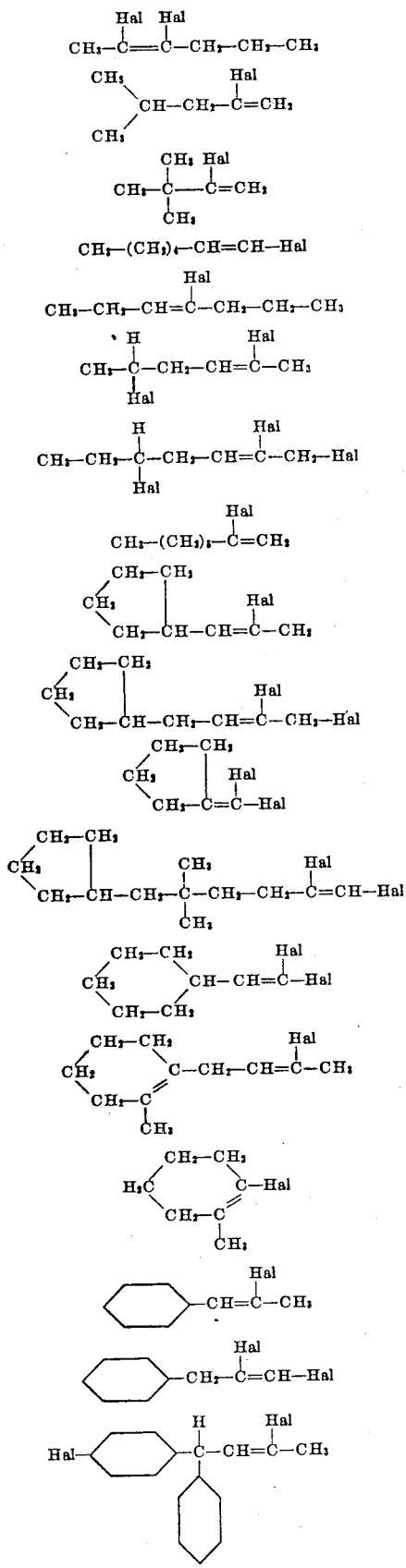

It is to be understood that in the vinyl-type halides treated the hydrogen atoms other than those included in the vinylic groupings may be substituted by alkyl, alkoxy, aralkyl aralkoxy, carbocyclic, heterocyclic and/or aryloxy groups which may or may not be further substituted as well as by any suitable organic radical or monovalent substituent.

As stated, the nature of the product obtained upon execution of the process of the invention depends upon the structure of the particular vinyl-type halide or halides treated. For example, if the treated halide comprises the grouping

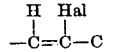

wherein the halogenated vinylic carbon atom is a secondary carbon atom, the overall reaction results in the formation of a ketonic compound. On the other hand, should the compound subjected to treatment contain a primary halogenated vinylic carbon atom, i. e., a halogenated vinylic carbon atom which is attached to only one other carbon atom, the reaction gives rise to the formation of an aldehydic compound. Where the treated compound contains a plurality of halogenated vinylic carbon atoms including a primary halogenated vinylic carbon atom, a product may result which is both aldehydic and ketonic, while the presence in the treated compound of a plurality of non-vicinal secondary halogenated vinylic carbon atoms usually results in a product containing a like number of ketone groups. In the case of a compound such an

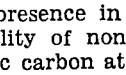

the product is a hydroxy ketone when both of the halogens are split off, but when only one of the halogens is split off, as is most usual, the product is a halogenated ketone $$R-\underset{\underset{Hal}{|}}{C}-\underset{\underset{O}{\|}}{C}-R$$

Halogenated carbonyl compounds are also obtainable by the process of the invention by the treatment of compounds comprising one or more halogen atoms attached to carbon atoms other than the vinylic carbon atoms contained therein. All of the reactions effectible by the process have in common that they each involve the splitting off of hydrogen halide.

While the present process is applicable to the treatment of any vinyl-type halide, it is preferred to treat vinyl-type halides wherein the halogen atoms are either chlorine, bromine or iodine. Among the specific conversions which may be effected by the process, the following may be mentioned: 2-chlorobutene-2 to methyl ethyl ketone, 1-bromopropylene-1 to propionaldehyde, 2-chloropropylene-1 to acetone, 1,3-dichlorpropylene-1 to β-chlorpropionaldehyde, isocrotyl chloride to isobutyraldehyde, vinyl bromide or chloride to acetaldehyde, 2-chlorohexene-1 to methyl butyl ketone, 1-chlorohexene-1 to hexaldehyde, etc.

The process of the invention may be executed by employing a wide variety of acid hydration agents or catalysts. Such agents or catalysts may be employed either severally or in combination. Excellent results can generally be obtained by employing the strong mineral oxyacids such as $H_2SO_4$, $H_3PO_4$, $H_4P_2O_6$, $H_4P_2O_7$, $H_3PO_3$, $H_4P_2O_5$, $HPO_3$, $H_3PO_2$, $H_3AsO_4$, and the like, and the mineral acid-acting oxyacids, for example, benzene sulfonic acid, its homologues, analogues and suitable substitution products. Mixtures of mineral oxyacids and/or mineral acid-acting oxyacids and mineral acid salts, such as the various acid phosphates, sulfates, and the like may be useful, particularly when working with halides which yield products that tend to polymerize to less desirable compounds in the presence of the acidic hydration agents applicable to the process or which are themselves inclined to polymerize. The addition of a suitable mineral acid salt or salts in such cases serves to modify the polymerization action of the hydration catalyst.

It will be understood that the chemical composition of the catalyst may vary during the course of the hydrtaion, depending upon the operating conditions. This is particularly true of the phosphoric acid catalysts.

The selected acidic hydration agent is employed in a substantially solid state in admixture with a solid siliceous or similar absorbent material. Absorptive materials suitable for use in preparing the solid acidic hydration catalysts applicable to the present process include: silica gel, alumina, activated charcoal, fuller's earth, Death Valley clay, kieselguhr, bentonite, activated aluminum hydrosilicate and similarly partially hydrated silicates and silicic acid compounds. The selected acid or acids may be precipitated on or otherwise incorporated on the surface of the selected absorptive material.

In the execution of the present process the solid acidic hydration agent which may be in the form of pellets, granules and the like may be packed into suitable tubes and employed in manners most customary in reactions of this sort. The reactants may be vaporized either in a separate vaporizer or vaporizers or in the forepart of the reaction zone. In most cases the reactants are passed over or through the catalyst at substantially atmospheric pressure but pressures of either higher or lower magnitude may be employed. The temperature at which the catalyst bed is maintained is the temperature most conducive to the desired reaction, under the other operating conditions. In most instances the optimum temperature is within the range of from about 200° C. to about 400° C.

The mol ratio of the principal reactants may be varied within wide limits. Where the product is difficulty separable from the reacted mixture, the ratio of reactants which provides for the highest conversion of halide to product per pass through the reaction zone is preferred. On the other hand, should the product be readily or reasonably easy to separate from the reacted mixture, operation at the feed composition which results in the highest production rate, i. e. the production of the greatest amount of product per liter of catalyst per unit time, is preferred. Execution of the process with an excess of unsaturated halide, to produce a reacted mixture which is essentially anhydrous, is advantageous if it is desired to recover the hydrogen halide in anhydrous form. The hydrogen halides form constant boiling mixtures with water and are consequently difficultly completely separable from the reaction mixture where an excess of water has been used. The anhydrous hydrogen halides produced by this mode of executing the process may find ready application, for example, in the manufacture of molecular halogens according to the Deacon process and modifications thereof. Operating with an excess of unsaturated halide to produce a reacted mixture substantially completely free of water may also facilitate recovery of product as where the product forms an azeotrope with water.

While unsaturated organic halides wherein the halogen atom or atoms are attached to saturated carbon atoms, the so-called allyl type halides, are unsuited for the purpose of the invention, the presence of such compounds in the material treated is without harmful effect although a modified recovery system may be necessary. Usually when material comprising an allyl type halide is subjected to the process, a large part of the allkyl fraction of the feed will pass through unchanged, while a relatively minor portion may be converted to a polyolefin by loss of hydrogen halide. The presence of allyl type halides in the treated material does not seem to affect the hydration agent adversely in the cases tested. In general, however, it is preferred not to treat material containing allyl type halides to an extent greater than 25%. Allyl type halides are readily removed from mixtures thereof with vinyl type halides by caustic hydrolysis.

The rate at which the principal reactants are passed into contact with the acidic hydration agent or catalyst depends, inter alia, upon the relative amount of hydration agent present and the temperature of the catalyst bed. It is desirable that the hydration agent be selected and that the contact time, pressure and temperature be adjusted to the character and quantity of the particular halide under treatment, so that the desired hydration occurs without the formation of excessive amounts of polymer.

Any suitable means may be employed to recover the product from the gaseous reaction mixture subsequent to the hydration step. Usually the gaseous reaction mixture is liquefied prior to the recovery procedure. The product may then be separated in a wide variety of suitable manners, depending on the specific product to be recovered and on the particular taste of the operator.

The present process is of particular value as applied to effect the conversion of 2-chlorobutene-2, which is a cheap by-product material for which few uses are known and which is available in large quantities, to methyl ethyl ketone, an excellent low boiling solvent substitutable in many instances for relatively more expensive solvents. In the production of methyl ethyl ketone from 2-chlorobutene-2 according to the process of the invention, the solid acidic hydration agent or catalyst is preferably one containing a phosphoric acid as the active component. A reaction temperature of from about 200° C. to about 300° C. has been found to provide the best overall results. Lower operating temperatures appear to decrease the activity of the catalyst which following use has a wet appearance, apparently from absorption of water and polymer, while higher operating temperatures do not result in a sufficient increase in conversion to justify the possible adverse effect upon catalyst life. It has also been found, that at a constant total feed rate of approximately 20 mols of reactant per liter of catalyst per hour, maximum conversion of 2-chlorobutene-2 to methyl ethyl ketone is obtained when the mol ratio of water to 2-chlorobutene-2 is about 2:1. Operation at a higher mol ratio of water to halide led to material reduction in the amount of halide converted to product. For example, in one test increasing the ratio from 2:1 to 12:1 caused a drop in conversion of 33%. Operation at a water to halide ratio of about 0.6:1 also resulted in decreasing the per cent of halide converted to product, but the amount of methyl ethyl ketone produced per liter of catalyst per unit time was substantially increased.

A convenient method for separating methyl ethyl ketone from a mixture containing water and HCl in addition to methyl ethyl ketone consists in diluting the mixture with sufficient additional water to reduce the HCl concentration on an organic-free basis to well below 20%, and thereafter separating the methyl ethyl ketone as its water azeotrope by fractionation. The azeotropic mixture which HCl forms with water contains about 20.24% HCl and boils at approximately 109° C. This is considerably higher than the boiling point of the constant boiling mixture methyl ethyl ketone forms with water.

The following examples, which are introduced in further illustration of the invention, are not to be considered as limiting the invention to the particular vinyl-type halides treated nor to the condition of operation disclosed.

Example I

The apparatus used comprised a reaction tube of suitable size disposed within an electric furnace and a column for scrubbing the reacted mixture with water. The tube was packed with approximately 400 cc. of a solid catalytic material, the active ingredient of which was orthophosphoric acid. The reactants, 2-chlorobutene-2 and water, were vaporized in separate vaporizers prior to their introduction into the tube which was provided with an unpacked preheater section. During the run, which lasted approximately four hours, the 2-chlorobutene-2 and water were fed to the tube at the rate of about 500 grams per liter of catalyst per hour, and 200 grams per liter of catalyst per hour, respectively. The mol ratio of the water to the 2-chlorobutene-2 was, roughly, 2:1. During the hydration the maximum temperature of the catalyst was 260° C., the average temperature 228° C.

The product gases issuing from the reaction tube were scrubbed with sufficient water to bring the aqueous HCl concentration (organic-free basis) to well below the composition of the constant boiling mixture so that the methyl ethyl ketone could be removed from it by distillation.

The mol per cent composition of the organic products produced by operating under the specified conditions was as follows:

| | |
|---|---|
| 2-chlorobutene-2 | 9.6 |
| Methyl ethyl ketone | 81.1 |
| Polymer | 2.1 |
| Unaccounted for by analysis | 7.2 |

Ninety mol per cent of the 2-chlorobutene-2 reacted, and of the reacted material 81% was converted to methyl ethyl ketone, 90% of which was recovered. The yield of methyl ethyl ketone based on the composition of the recovered products, experimental losses being assumed as proportionated between the products, was 99%.

Example II

Water and 2-chlorobutene-2 in the mol ratio of 0.6:1 were fed, after vaporization, into a reactor tube packed with about 360 cc. of a solid phosphoric acid catalyst, in the form of pellets. The total feed rate was slightly in excess of 20 mols of reactants per liter of catalyst per hour. The run lasted about one hour, the temperature of the catalyst bed averaging about 230° C. Of the total 2-chlorobutene-2 fed to the reactor, 66 mol per cent reacted, while the mol per cent yield of methyl ethyl ketone on the basis of the reacted chloride and the amount recovered was 90%. Sufficient methyl ethyl ketone was formed in this experiment to account for all of the water of the reaction. The production rate was almost 600 grams of methyl ethyl ketone per liter of catalyst. This substantially doubled the production rate obtained in a previous run conducted under like conditions but wherein the mol ratio of water to 2-chlorobutene-2 was 2:1.

Example III

Vaporized isocrotyl chloride and steam were fed to a reaction tube filled with a solid phosphoric acid catalyst at a total feed rate of about 30 mols of reactants per liter of catalyst per hour. The water to halide mol ratio was about 4:1. During the run the average temperature of the catalyst bed was approximately 230° C. About 30% of the isocrotyl chloride was converted to a carbonyl product, identified as isobutyraldehyde.

Example IV

When an unsaturated $C_4$ chloro-alcohol, 1-hydroxy-2-chlorobutene-2, was vaporized and passed over the solid phosphoric acid catalyst of Example III together with steam, about 19% was converted to a carbonyl product, hydroxy methyl ethyl ketone. In this experiment the water ratio was about 3:1, the total feed rate about 20 mols of reactants per liter of catalyst per hour, and the average temperature of the catalyst bed 280° C.

Example V

A series of experiments were conducted using the same catalyst but substituting 1-chloropropylene-1 and 2-chloropropylene-1 as the halide reactants. The chlorine atom of 2-chloropropylene-1 was found most easily attacked. Highest yield of propionaldehyde from 1-chloropropylene-1 was obtained at the highest temperature employed, which was 250° C. During this run the mol ratio of water to halide was about 3:1 and the total feed rate a little over 10 mols of reactants per liter of catalyst per hour. The carbonyl product obtained in the case of 2-chloropropylene-1 was acetone.

In the appended claims, the term "mineral acid-acting oxyacid" is intended as encompassing the mineral oxyacids such as those specifically hereinabove named, as well as oxyacids which act as mineral acids.

We claim as our invention:

1. A process for preparing methyl ethyl ketone from 2-chlorobutene-2 which comprises reacting 2-chlorobutene-2 and water at a temperature between about 200° C. and about 300° C. in the presence of a solid hydration agent containing a phosphoric acid as the active ingredient.

2. A process for preparing isobutyraldehyde from isocrotyl chloride which comprises reacting isocrotyl chloride and water in vapor phase in the presence of a solid hydration agent containing a phosphoric acid as the active ingredient.

3. A process for preparing hydroxy methyl ethyl ketone from 1-hydroxy-2-chlorobutene-2 which comprises reacting 1-hydroxy-2-chlorobutene-2 and water in vapor phase in the presence of a solid hydration agent containing a phosphoric acid as the active ingredient.

4. A process for preparing a ketonic compound which comprises passing a mixture, in the vapor phase, of water and a halogen-containing hydrocarbon having an aliphatic chain containing a halogenated olefinic carbon atom to which a saturated carbon atom is directly attached in contact with a solid hydration agent comprising a strong free mineral oxyacid and an absorbent material.

5. A process for preparing an aldehydic compound which comprises passing a mixture, in the vapor phase, of water and a halogen-containing aliphatic hydrocarbon having a terminal halogenated olefinic carbon atom in contact with a solid hydration agent comprising a strong free mineral oxyacid and an absorbent material.

6. A process for preparing a carbonylic compound of the class consisting of ketonic and aldehydic compounds which comprises passing a mixture, in the vapor phase, of water and a compound of the class consisting of halogen-containing hydrocarbons and hydroxy substitution products thereof having an aliphatic chain containing a halogenated olefinic carbon atom in contact with a solid hydration agent comprising a strong free mineral oxyacid and an absorbent material.

7. A process for preparing a ketonic compound which comprises passing a mixture, in the vapor phase, of water and a hydroxy-substituted halogen-containing aliphatic hydrocarbon having a halogenated olefinic carbon atom to which a saturated carbon atom is directly attached in contact with a solid hydration agent comprising a strong free mineral oxyacid and an absorbent material.

8. A process for preparing methyl ethyl ketone which comprises passing a mixture in the vapor phase of water and 2-chlorobutene-2 in contact with a solid hydration agent comprising a strong free polybasic mineral oxyacid of phosphorus and an absorbent material.

JOHN ANDERSON.
RAYMOND M. STAGER, Jr.
SUMNER H. McALLISTER.